(12) United States Patent
Jung

(10) Patent No.: US 8,353,419 B2
(45) Date of Patent: Jan. 15, 2013

(54) LOCKABLE CAP

(75) Inventor: Richard Jung, Irvine, CA (US)

(73) Assignee: Takeya USA Corporation, Huntington Beach, CA (US)

( * ) Notice: Subject to any disclaimer, the term of this patent is extended or adjusted under 35 U.S.C. 154(b) by 101 days.

(21) Appl. No.: 12/965,551

(22) Filed: Dec. 10, 2010

(65) Prior Publication Data

US 2012/0145713 A1  Jun. 14, 2012

(51) Int. Cl.
*B65D 51/18* (2006.01)
(52) U.S. Cl. ............... 220/254.3; 220/756; 220/833
(58) Field of Classification Search .......... 220/254.3, 220/277–278, 915.1, 521, 741, 758–760, 220/762, 764–767, 315, 318, 756, DIG. 19, 220/710.5, 212, 212.5, 833–835, 322, 592.12, 220/592.16, 592.17, 326; 215/237, 277–278, 215/293–294, 329, 346, 273, 219, 396, 216, 215/235, 250, 252–253, 256, 316, 355, 341
See application file for complete search history.

(56) References Cited

U.S. PATENT DOCUMENTS

| | | | |
|---|---|---|---|
| 2,272,798 A | 2/1942 | Hacmac | |
| 2,272,867 A | 2/1942 | Cobel | |
| 2,879,916 A * | 3/1959 | Hoffmann et al. | 220/322 |
| 4,127,221 A | 11/1978 | Vere | |
| 4,351,448 A * | 9/1982 | Ingersoll et al. | 220/318 |
| 4,537,044 A * | 8/1985 | Putnam | 62/371 |
| 5,226,553 A * | 7/1993 | Fiore | 220/318 |
| 5,295,365 A * | 3/1994 | Redford | 62/265 |
| 5,344,037 A | 9/1994 | Favre | |
| 6,105,809 A * | 8/2000 | Yamanaka | 220/326 |
| 6,206,221 B1 | 3/2001 | Bando et al. | |
| 6,442,426 B1 * | 8/2002 | Kroll | 607/4 |
| 6,981,607 B2 * | 1/2006 | Lown et al. | 220/254.3 |
| 7,243,816 B2 | 7/2007 | Aochi | |
| 7,246,718 B2 * | 7/2007 | Einav et al. | 220/764 |
| 7,275,653 B2 | 10/2007 | Tedford, Jr. | |
| 7,712,618 B2 * | 5/2010 | Barre et al. | 215/237 |
| 2002/0036207 A1 * | 3/2002 | Ohuo et al. | 220/830 |
| 2003/0136783 A1 | 7/2003 | Hatsumoto et al. | |
| 2005/0269325 A1 | 12/2005 | Belcastro | |
| 2007/0023442 A1 * | 2/2007 | Auzenne | 220/801 |

FOREIGN PATENT DOCUMENTS

| | | |
|---|---|---|
| DE | 8531116 | 12/1985 |
| EP | 0154897 | 9/1985 |
| GB | 1074073 | 6/1967 |

OTHER PUBLICATIONS

Extended Search Report from European Patent Office on EP application (EP10171287.5) dated Jan. 20, 2011.

* cited by examiner

*Primary Examiner* — Luan K Bui
*Assistant Examiner* — Brijesh Patel
(74) *Attorney, Agent, or Firm* — Klein, O'Neill & Singh, LLP

(57) ABSTRACT

A lockable cap assembly including a handle having at least one protrusion, and a flip cap defining an internal chamber surrounded by a flip cap edge. The flip cap including at least one locking groove configured to engage the at least one protrusion, and an engagement surface. The lockable cap also including a collar having a release mechanism for engaging with the engagement surface. The flip cap being moveable between an open configuration in which a portion of the flip cap edge is not in contact with a surface of the collar and a closed configuration in which the flip cap edge is in full contact with the collar.

14 Claims, 4 Drawing Sheets

LOCKABLE CAP

BACKGROUND

1. Technical Field

The present disclosure relates to drinking bottles, and more particularly to lockable, reclosable closures for drinking bottles.

2. Relevant Art

Drinking bottles, such as water and soda bottles, are lightweight, reclosable and provide a convenient way to transport beverages. Generally, most drinking bottles are made with a corresponding cap used to close and sometimes seal the bottle. Drinking bottles typically have a screw on cap to allow easy access to the contents of the container. The user generally unscrews the cap from the bottle, removes the contents, and then screws the cap back on the bottle.

In such a configuration, threading is usually found on the outside of the neck of the bottle, which serves as the drinking area. The threads positioned on the drinking area of the bottle may be uncomfortable to a user's lips contacting the threaded surface when drinking.

In configurations of drinking bottles that attempt to remove the threads from the drinking area, the ability to re-close and seal the drinking bottle becomes a challenge. In instances were caps are placed over the drinking area, the ability to lock or secure the cap while still maintaining a sealed bottle have not been completely successful.

SUMMARY

The present disclosure provides a cap assembly for use with a drinking bottle. The cap assembly allows for the drinking bottle to be re-closed and resealed without the need for encumbering the drinking area with threads. In addition, the cap assembly provides the ability to lock the cap assembly into the closed and sealed position.

In one aspect a lockable cap assembly is provided including a handle having at least one protrusion, and a flip cap defining an internal chamber surrounded by a flip cap edge. The flip cap includes at least one locking groove configured to engage the at least one protrusion, and an engagement surface. The lockable cap also includes a removable collar including a release mechanism for engaging with the engagement surface. The flip cap is moveable between an open configuration in which a portion of the flip cap edge is not in contact with a surface of the collar and a closed configuration in which the flip cap edge is in full contact with the collar.

In another aspect, a lockable cap assembly provided including handle having a cross member and a first leg, which includes a first protrusion and a second leg, which includes a second protrusion, where each leg extends perpendicularly from the cross member. The lockable cap also includes a flip cap defining an internal chamber surrounded by a flip cap edge. The flip cap includes a first locking groove and a second locking groove each formed on an opposing side surface of the flip cap and each locking groove is configured to engage the first and second protrusions. The flip cap also has an engagement surface formed on a side surface of the flip cap at a right angle to the locking grooves. A plug is positioned in the internal chamber and coupled to an internal surface of the flip cap. A removable collar is provided that includes a release mechanism for engaging with the engagement surface. The flip cap is moveable between an open configuration in which a portion of the flip cap edge is not in contact with a surface of the collar and a closed configuration in which the flip cap edge is in full contact with the collar, and the handle is moveable to a locked position in which the first and second protrusions are engaged with the first and second locking grooves.

In yet another aspect, a method is provided for locking a cap to a bottle. The method includes securing a removable collar to a bottle, where the removable collar includes a handle having at least one protrusion, and a flip cap defining an internal chamber surrounded by a flip cap edge, where the flip cap includes at least one locking groove configured to engage the at least one protrusion and an engagement surface. The collar also includes a release mechanism for engaging with the engagement surface. The method further includes moving the flip cap between an open configuration in which a portion of the flip cap edge is not in contact with a surface of the collar and a closed configuration in which the flip cap edge is in full contact with the removable collar; and moving the handle to a locked position in which the at least one protrusion is engaged with the at least one locking groove.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features of the present disclosure will now be described with reference to the drawings of an illustrated embodiment. In the drawings, the same components have the same reference numerals. The illustrated embodiment is intended to illustrate, but not to limit the disclosure. The drawings include the following Figures.

DETAILED DESCRIPTION

Figure 1:
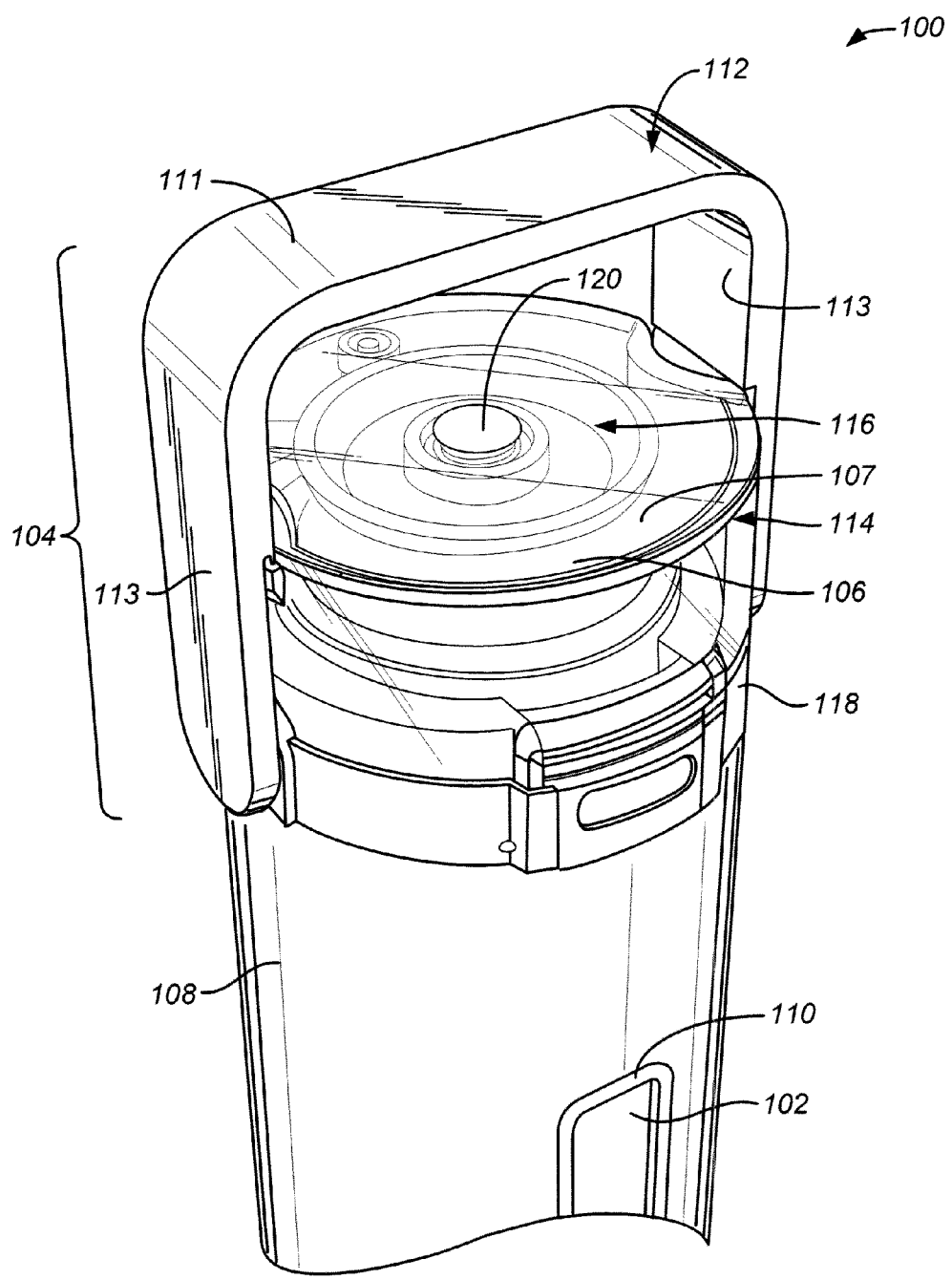
FIG. 1 is a perspective view of a drinking bottle assembly according to an embodiment.

FIG. 1 is a perspective view of a bottle assembly 100 according to an embodiment of the present disclosure. The bottle assembly 100 includes a bottle 102 and a cap assembly 104, which includes a handle 112, a flip lid or cap 114, a plug 116 and a removable collar 118.

The bottle 102 defines a volume used to hold or contain a substance which may be made to flow from the bottle, for example a liquid, a powder and the like. It should be understood that the bottle 102 may be formed in any shape that is suitable for defining the volume, with each shape terminating at a continuous, cylindrically shaped neck section having an open area delineated by an upper edge or rim 106 that forms a dispensing end of the bottle. In one embodiment, the bottle 102 may have a generally circular cross-section that terminates at the upper rim 106 of the continuous, cylindrically shaped neck section. The neck section may be divided into two portions. A first portion of the neck section is a drinking area 107, which stems from the upper rim 106 and includes an area adjacent the upper rim 106. The drinking area is the portion of the neck section devoid of threads or other contoured surfaces to provide a more comfortable drinking surface. A second portion of the neck section, formed just below the drinking area 107 includes threads (not shown) for mounting and securing the cap assembly 104 to the bottle 102 as described in detail below.

In the illustrated embodiment, the bottle 102 is generally cylindrical, and includes a sleeve 108 having lengthwise indentations 110, which may be included for both aesthetic and functional purposes. The bottle 102 also has a generally flat base or bottom surface, which allows the bottle to stand upright on a flat surface.

In accordance with an embodiment, the bottle 102 may be made of a glass, a plastic, a metal or metal alloy, and the like using any appropriate manufacturing process, such as injection molding and blow-type molding. For example, the bottle may be made of any suitable type of glass, such as silicon dioxide, Pyrex, lead crystal and the like. The metal bottle, for example, may be made of any suitable type of metal, such as aluminum, stainless steel, suitable alloys of any suitable metals and the like. The bottle 102 may be designed to any desired volume. For example, the bottle 102 may be designed to hold from about 4 ounces to about 64 ounces. A bottle suitable for use as part of the bottle assembly 100 is described in U.S. Ser. No. 12/629,266, filed Dec. 2, 2009, which is incorporated herein by reference in its entirety for all purposes.

Figure 2:
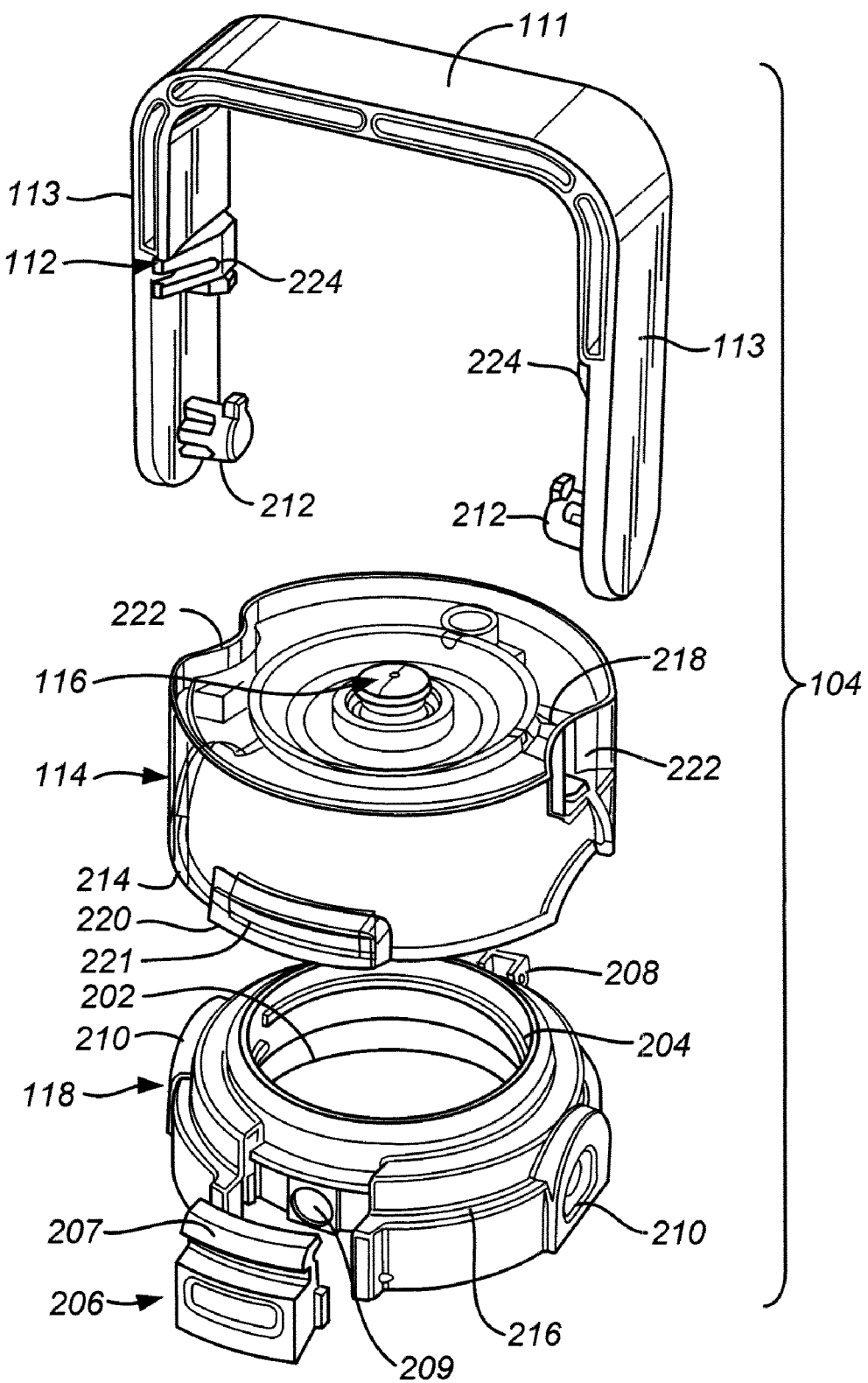
FIG. 2 is an exploded view of the cap assembly in accordance with an embodiment.

FIG. 2 is an exploded view of the cap assembly 104 in accordance with an embodiment. As shown in FIG. 2, the handle 112 includes a cross member 111 having two perpendicularly extending legs 113, which together create a generally "u-shaped" handle. The cross member 111 is generally sized and shaped for grasping by the human hand so that that the bottle assembly 100 may be carried by the handle. As described below, the handle 112 includes a locking feature, which includes protrusions 224 for engagement with corresponding grooves formed on the flip cap 114. As also described below, the handle 112 includes insertable members 212 that provide a bearing surface insertable into bushings 210 formed on the removable collar 118 that allow the handle to be rotated between an unlocked configuration and a locked configuration.

In one embodiment, the removable collar 118 defines an opening 202. The opening 202 is configured to receive therethrough the neck section of the bottle 102. Once the neck section is placed through the opening 202, the removable collar 118 is seated on the second portion of the neck portion. Internal threads 204 on collar 118 may be made to engage with the threads (not shown) on the second portion of the neck section to secure the collar 118 to the bottle 102. However the second portion of the neck section and the removable collar 118 may be fitted together using any suitable connection, such as snap elements for providing a snap-fit connection. Alternately, the removable collar 118 may be sized to be press-fitted onto the second portion of the neck section. When the collar 118 is secured to the bottle 102, the upper rim 106 and the drinking area 107 extend through the opening 202 a distance appropriate to allow a person to comfortably apply their lips to the drinking area 107.

The removable collar 118 also includes a release mechanism 206 positioned on one side of the removable collar, and collar hinge components 208 disposed on an opposite side from the release mechanism. A pair of opposed bushings 210, which are configured to receive the insertable portions 212 of the handle 112, are positioned on sides of the removable collar generally at right angles to the release mechanism 206 and hinge components 208. The insertable members 212 include bearing surfaces that are received into the bushings 210 to allow handle 112 to rotate about the axis of the bushings between a locked position and an unlocked position as described below.

Figure 3:
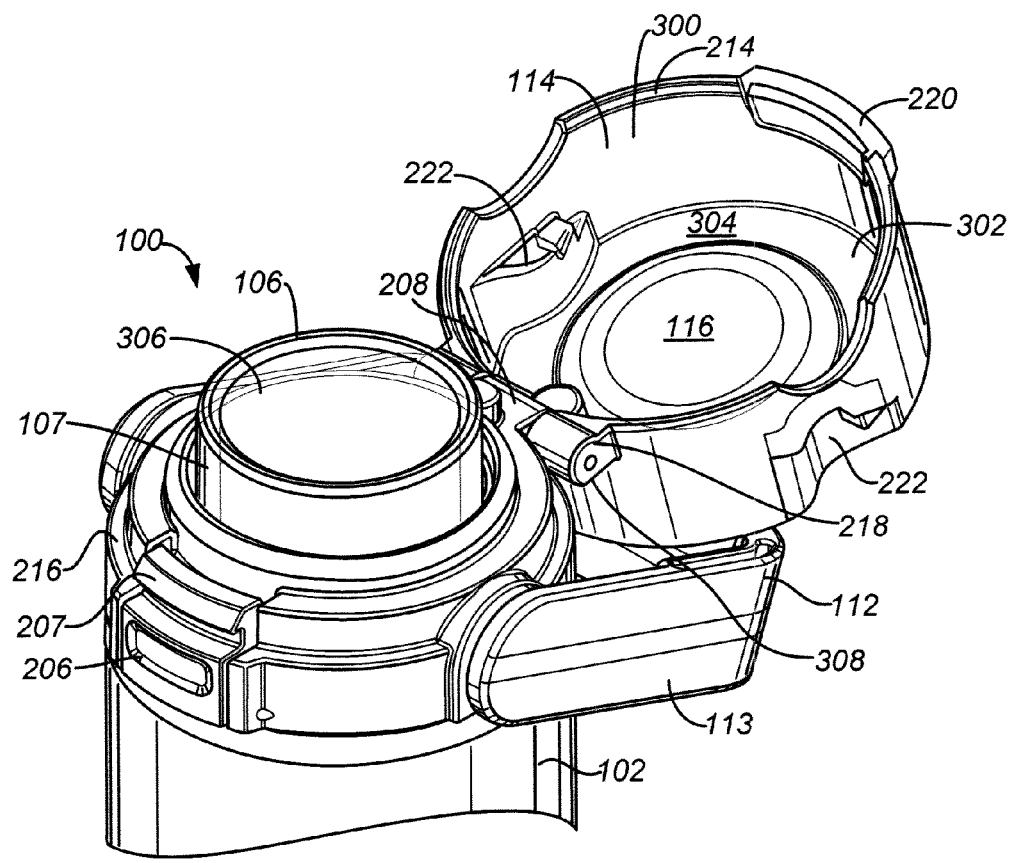
FIG. 3 is a perspective view of the cap assembly with the handle in the unlocked position and with the flip cap in the open configuration in accordance with an embodiment.

The flip cap 114 is a cylindrically shaped cap that fits over the drinking area 107 of the bottle 102 to provide a closure thereto. The flip cap 114 may be made of any suitable material, such as plastic or the like, and in most embodiments is made of a clear or "see-through" material. As shown in FIG. 3, the flip cap 114 defines an opening 300 that provides access to an internal chamber 302 of the flip cap 114. The perimeter of the opening is outlined by a lid edge 214. Referring now to FIGS. 2 and 3, when the flip cap 114 is engaged with the removable collar 118, the lid edge 214 rests on a collar edge 216 formed on the surface of the removable collar.

On one end of the flip cap 114 are lid hinge components 218 that may be operatively mated to the collar hinge components 208 to create a complete hinge 308. In this manner, the flip cap 114 may be coupled to the removable collar 118 via complete hinge 308 and rotated between an open configuration, where the flip cap 114 is away from the drinking area to allow access to the drinking area 107 and a closed configuration, where the flip cap encloses the drinking area 107.

An engagement surface 220 is provided on one side of the flip cap 114 opposite of the cap hinge components 218. The engagement surface 220 is positioned on the flip cap to matingly engage with the release mechanism 206 on the removable collar 118 when the flip cap 114 is in the closed configuration. The engagement surface 220 and the release mechanism 206 may be any suitable releasable latch/catch configurations, which are generally well known in the art. Using any suitable configuration, the engagement surface 220 contacts the release mechanism 206, such that when engaged, the flip cap edge 214 remains firmly pressed against the collar edge 216 (closed configuration). When the engagement is removed, the flip cap edge 214 may be allowed to freely rotate away from the collar edge 216 (open configuration).

In one embodiment the release mechanism 206 includes a latching surface 207 and a spring (not shown) that biases the latching surface 207 against a surface 209 of the removable collar 118. In this embodiment, the release mechanism 206 functions like a spring loaded button. The engagement surface 220 on the flip cap 114 also includes a corresponding latching surface 221 that is configured to engage the latching surface 207 on the release mechanism 206. When the flip cap is closing, the engagement surface 220 contacts and presses against the release mechanism 206, the release mechanism is depressed allowing the two latching surfaces 207 and 221 to move against one another until the oppositely facing latching surfaces engage one another. The spring bias in the release mechanism holds the latching surfaces in the engaged position. To release the engaged latching surfaces, the release mechanism 206 may be manually depressed causing the latching surface 207 of the release mechanism 206 to disengage from the latching surface 221 of the engagement surface 220. In one embodiment, the complete hinge 308 may be biased or spring loaded such that the flip cap 114 automatically moves to the open configuration when the engagement between the engagement surface 220 and the release mechanism 206 is removed.

The plug 116 is disposed within the internal chamber 302 (FIG. 3) and attached to an internal top surface 304 (FIG. 3) of the flip cap 114. As shown in FIG. 1, the plug 116 is coupled to the internal top surface 304 using an attachment member 120. The attachment member 120 is smaller in diameter then the outer diameter of the plug 116, and acts as a stem, which holds the plug 116 substantially suspended within the internal chamber away from the internal top surface 304.

In one embodiment, the plug 116 is a pliable diaphragm or gasket made from, for example, silicone, rubber and the like. The plug 116 is sized and shaped to be mated to the upper rim 106 of the bottle 102. When mated together, the plug 116 may be pressed against the upper rim 106 to seal the bottle 102. The plug 116 is moved into a sealing relationship with the upper rim 106 of bottle 102 when the flip cap 114 is rotated about the complete hinge and moved into the closed configuration.

In one embodiment, the flip cap 114 also includes a pair of opposed locking grooves 222 positioned on each side of the flip cap 114. The locking grooves 222 are formed into a side surface of the flip cap 114 at approximately right angles to the engagement surface 220. When in the closed configuration of the flip cap, the locking grooves 222 become substantially in-line with the bushings 210. In one embodiment, the locking grooves 222 are configured to slidably receive the corresponding protrusions 224 foamed on each leg 113 of handle 112. The locking grooves 222 are tapered to receive the tapered surface of the protrusions 212 from a first direction and capture the protrusions 212 therein. The locking grooves 222 include a blocking surface formed as part of the internal surface of the locking grooves. The blocking surface butts against the captured protrusions 224 and thus restricts the handle 112 from continuing to rotate in the first direction past a centerline of the bottle 102. This restriction stops the rotation of the legs 113 at a position perpendicular to the top surface of the closed flip cap. which positions the legs substantially in-line with the bushings 110, around which the handle 112 rotates (the "in-line" position. see FIG. 4C).

Once in the in-line position, the engagement between the protrusions 224 and the locking grooves 222 of the flip cap 114 prevents the flip cap 114 from being opened, thus locking the flip cap 114 in the closed configuration. When the handle 112 is in the locked position, even if the release mechanism 206 is activated, the flip cap 114 is prevented from moving to the open configuration.

Figure 4A:
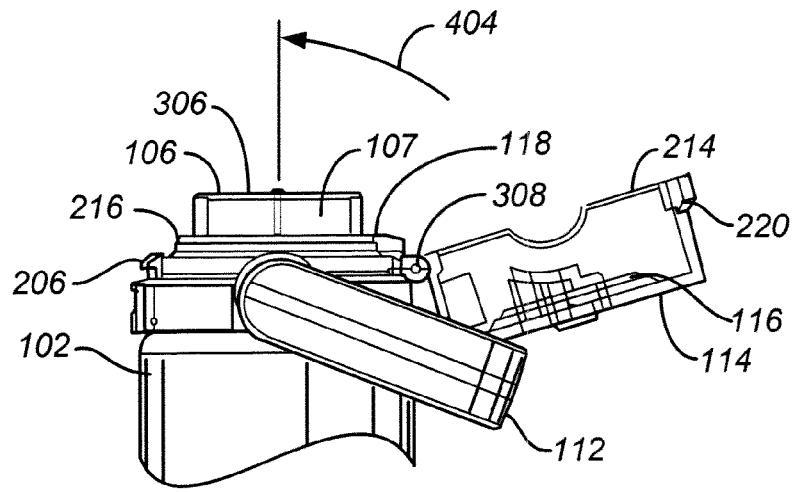
FIG. 4A is a side view of the bottle assembly in an open configuration and unlocked position.
Figure 4B:
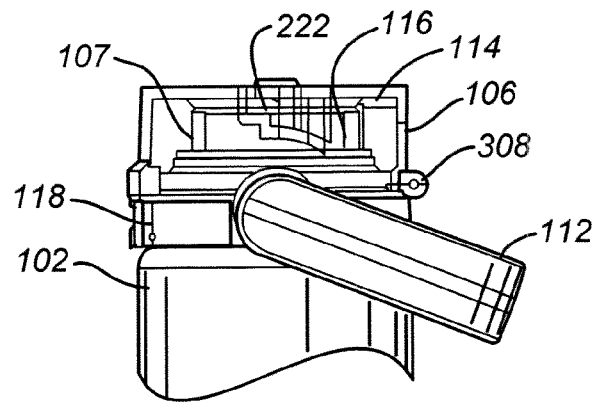
FIG. 4B is amide view of the bottle assembly in a closed configuration and unlocked position and FIG. 4C is a side view of the bottle assembly in a closed configuration and locked position in accordance with an embodiment.

FIG. 4A is a perspective view of the cap assembly 104 with the handle 112 in the unlocked position and with the flip cap 114 in the open configuration in accordance with an embodiment. As shown in FIG. 4A, when in the open configuration, the handle 112 and the flip cap 114 have been rotated away from opening 306 defined by upper rim 106 of bottle 102. In this position, a user may be able to pour a liquid out from, or in to the bottle 102 or the user may be able to drink directly from the drinking area 107.

Figure 4C:
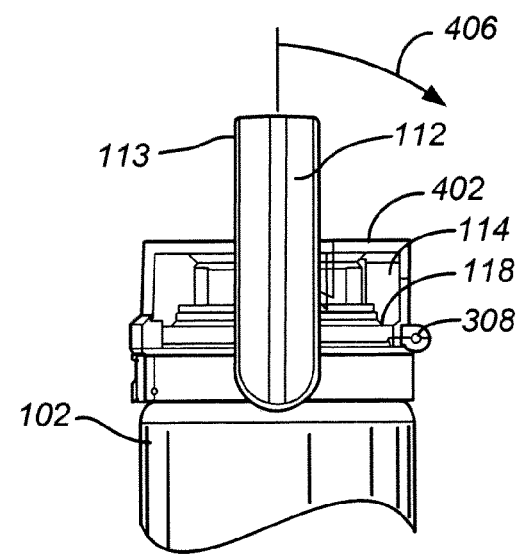

To move the flip cap 114 from the locked, closed configuration of FIG. 4C to the unlocked, open configuration of FIG. 4A, the handle 112 is moved in a second direction 406 (the reverse of the first direction) away from the in-line position. The handle 112 is rotated with sufficient force to overcome the resistance created by the engagement between the protrusions 224 (FIG. 1) and the locking grooves 222. Once the handle 112 is rotated to the unlocked position, the release mechanism 206 on the collar 118 may be depressed to release the engagement surface 220 of the flip cap 114. In most embodiments, the complete hinge 308 may be biased or spring loaded, such that when the engagement between the engagement surface 220 and the release mechanism 206 is removed, the flip cap edge 214 automatically moves away from the collar edge 216 and the plug 116 is removed from the sealing engagement with the upper rim 106 of bottle 102.

As shown in FIG. 4C, once the flip cap 114 is in the closed configuration, the handle 112 may be rotated in the first direction 404 (FIG. 4A) until the legs 113 are substantially orthogonal with the top surface 402 of the flip cap 114. In this position, the protrusions 224 formed on the inside surface of the handle 112 (FIG. 1) are engaged with the locking grooves 222 formed on the external side surface of the flip cap 114. With the protrusions captured in the locking grooves, the handle 112 is unable to continue to rotate in the first direction 404 beyond the centerline of bottle 102. The mating between the protrusions 224 and the locking grooves 222 holds the flip cap 114 locked in the closed configuration, since the flip cap 114 may not rotate to the open configuration, even if the release mechanism 206 is depressed.

To move the flip cap 114 from the locked, closed configuration of FIG. 4C to the unlocked, open configuration of FIG. 4A, the handle 112 is moved in a second direction 406 (the reverse of the first direction) away from the in-line position. The handle 112 is rotated with sufficient force to overcome the resistance created by the engagement between the protrusions 224 (FIG. 1) and the locking grooves 2. Once the handle 112 is rotated to the unlocked position, the release mechanism 206 on the collar 118 may be depressed to release the engagement surface 220 of the flip cap 114. In most embodiments, the complete hinge 308 may be biased or spring loaded, such that when the engagement between the engagement surface 220 and the release mechanism 206 is removed, the flip cap edge 214 automatically moves away from the collar edge 216 and the plug 116 is removed from the sealing engagement with the upper rim 106 of bottle 102.

Although the present disclosure has been described with reference to specific embodiments, these embodiments are illustrative only and not limiting. Many other applications and embodiments of the present disclosure will be apparent in light of this disclosure and the following claims.

What is claimed is:

1. A lockable cap assembly for removable attachment to a bottle having an upper end defining an opening, the assembly comprising:
   a handle including at least one protrusion;
   a flip cap having an internal top surface and defining an internal chamber surrounded by a flip cap edge, the flip cap including at least one locking groove configured to engage the at least one protrusion, and an engagement surface;
   a collar configured for removable attachment to the upper end of the bottle, the collar including a release mechanism for engaging with the engagement surface, the flip cap moveable between an open configuration in which a portion of the flip cap edge is not in contact with a surface of the collar and a closed configuration in which the flip cap edge is in full contact with the collar; and
   a plug disposed within the internal chamber and attached to the internal top surface of the flip cap, wherein, when the collar is attached to the upper end of a bottle, the plug is configured to close the opening of the bottle when the flip cap is in the closed configuration and to open the opening of the bottle when the flip cap is in the open configuration.

2. The lockable cap assembly of claim 1, wherein the handle is moveable to a locked position in which the at least one protrusion is engaged with the at least one locking groove.

3. The lockable cap assembly of claim 1, wherein the opening of the bottle is defined by an upper rim, and wherein the plug is configured to mate in a sealing relationship with the upper rim of the bottle when the flip cap is in the closed configuration.

4. The lockable cap assembly of claim 1, wherein the plug comprises a silicone plug.

5. The lockable cap assembly of claim 1, wherein the release mechanism comprises a depressable surface configured to releasably engage the engagement surface.

6. The lockable cap assembly of claim 1, wherein the flip cap comprises a flip cap hinge component that is operatively engaged with a collar hinge component to form a flip cap hinge, and wherein the flip cap hinge is spring loaded.

7. The lockable cap assembly of claim 1, wherein the handle further comprises at least two insertable members, and wherein the collar comprises at least two bushings each configured to rotatably receive one of the insertable members.

8. The lockable cap assembly of claim 1, wherein the flip cap comprises a clear flip cap.

9. A lockable cap assembly for removable attachment to a bottle having an upper end defining an opening, the assembly comprising:
- a handle including a cross member and a first leg including a first protrusion and a second leg including a second protrusion, each leg extending perpendicularly from the cross member;
- a flip cap having an internal top surface and defining an internal chamber surrounded by a flip cap edge, the flip cap including a first locking groove and a second locking groove each formed on an opposing side surface of the flip cap and each locking groove configured to engage the first and second protrusions, and an engagement surface formed on a side surface of the flip cap;
- a plug positioned in the internal chamber and coupled to the internal top surface of the flip cap; and
- a collar removably attachable to the upper end of the bottle, the collar including a release mechanism for engaging with the engagement surface, the flip cap moveable between an open configuration in which a portion of the flip cap edge is not in contact with a surface of the collar and a closed configuration in which the flip cap edge is in full contact with the collar, and the handle moveable between a locked position in which the first and second protrusions are engaged with the first and second locking grooves and an unlocked position in which the protrusions are not engaged with the locking grooves;
- wherein, when the collar is attached to the upper end of the bottle, the plug is configured to close the opening of the bottle when the flip cap is in the closed configuration and to open the opening of the bottle when the flip cap is in the open configuration.

10. The lockable cap assembly of claim 9, wherein the opening of the bottle is defined by an upper rim, and wherein the plug is configured to mate in a sealing relationship with the upper rim of the bottle to close the opening when the collar is attached to the bottle and the flip cap is in the closed configuration.

11. The lockable cap assembly of claim 9, wherein the plug comprises a silicone plug.

12. The lockable cap assembly of claim 9, wherein the release mechanism comprises a depressable surface configured to releasably engage the engagement surface.

13. The lockable cap assembly of claim 9, wherein the flip cap comprises a flip cap hinge component that is operatively engaged with a collar hinge component to form a flip cap hinge, and wherein the flip cap hinge is spring loaded.

14. The lockable cap assembly of claim 9, wherein the handle further comprises at least two insertable members, and wherein the collar comprises at least two bushings each configured to rotatably receive one of the insertable members.

* * * * *